(12) United States Patent
Parmet et al.

(10) Patent No.: US 8,441,396 B2
(45) Date of Patent: May 14, 2013

(54) SYSTEMS AND METHODS OF PROVIDING ERROR TOLERANT ROBUST SIMPLEX WIRELESS DATA FOR SYSTEMS EMPLOYING TIME CORRELATED DATA TRANSFER

(75) Inventors: Darryl I. Parmet, Tampa, FL (US); Jamal Haque, Clearwater, FL (US); Mark D. DuBois, Brandon, FL (US)

(73) Assignee: Honeywell International Inc., Morristown, NJ (US)

( * ) Notice: Subject to any disclaimer, the term of this patent is extended or adjusted under 35 U.S.C. 154(b) by 218 days.

(21) Appl. No.: 13/156,967

(22) Filed: Jun. 9, 2011

(65) Prior Publication Data

US 2012/0124452 A1 May 17, 2012

Related U.S. Application Data

(60) Provisional application No. 61/412,844, filed on Nov. 12, 2010.

(51) Int. Cl.
*H03M 13/00* (2006.01)
*G01S 7/40* (2006.01)

(52) U.S. Cl.
USPC .......................................... 342/172; 714/758

(58) Field of Classification Search .................. None
See application file for complete search history.

(56) References Cited

U.S. PATENT DOCUMENTS 5,659,298 A 8/1997 Brooks
5,982,742 A 11/1999 Leung
6,009,356 A 12/1999 Monroe
6,507,572 B1 1/2003 Kumar
2009/0207832 A1 8/2009 Senthilanathan

OTHER PUBLICATIONS

Buckley, "Wireless Inertical 6 DOF Measurement System Offers Maximum Flexibilty for Motion Detection", "http://www.eetimes.eu/en/wireless-inertial-6-dof-measurement-system-offers-maximum-flexibility-for-motion-detection.html?cmp_id=7&news_id=222904163", Oct. 18, 2010, p. 1 Publisher: EE Times Europe.
Cheng, "Compressing Inertical Motion Data in Wireless Sensing Systems—An Initial Experiment", "Proceedings of the 5th International Workshop on Wearable and Implantable Body Sensor Networks", Jun. 2008, pp. 293-296, Publisher: IEEE, Published in: Hong Kong, China.
Davidson, "Fundamentals of the Simplex Comunication Channel With Retransmissions", Apr. 14, 1997, pp. 1-208, Published in: Blacksburg, Virginia.

(Continued)

*Primary Examiner* — Guerrier Merant
(74) *Attorney, Agent, or Firm* — Fogg & Powers LLC

(57) ABSTRACT

Systems and methods of providing error tolerant robust simplex wireless data for systems employing time correlated data transfer are provided. In one embodiment, a system comprises: sensors that produce samples of time correlated data; and a node coupled to the sensors by a wireless link. The link comprises a primary stream for simplex transmission of data packets, and a secondary stream for simplex transmission of delayed data packets, the delayed data packets a delayed retransmission of the time correlated data. When the node receives a first data packet from a first sensor via the primary stream, the data receiving node check validity. When the first data packet is corrupted, the node validity checks a second data packet received via the secondary stream. When both packets contain corrupted data, the node builds a reconstructed plurality of sequential time correlated data samples based on non-corrupted data samples from within the data packets.

20 Claims, 7 Drawing Sheets

OTHER PUBLICATIONS

Huszak, "DCCP-Based Multiple Retransmission Technique for Multimedia Streaming", "Proceedings of MoMM2008", Nov. 2008, pp. 21-28, Publisher: MoMM2008, Published in: Linz, Austria.

Lai, "A Prototype Wireless Inertial-Sensing Device for Measuring Toe Clearance", "30th Annual International IEEE EMBS Conference", Aug. 2008, pp. 4899-4902, Publisher: IEEE, Published in: Vanouver, British Columbia, Canada.

Li, "Perceived Speech Quality Driven Retransmission Mechanism for Wireless VOIP", "Fourth International Conference on 3G Mobile Communication Technologies", Jun. 2003, pp. 395-399, Published in: London, UK.

Marinkovic, "Energy-Efficient TDMA-Based MAC Protocol for Wireless Body Area Networks", "Third International Conference on Sensor Technologies on Applications", Jun. 2009, pp. 604-609, Publisher: SENSORCOMM '09.

Niu, "A Delayed Multiple Copy Retransmission Scheme for Data Communication in Wireless Networks", "Journal of Communications and Networks", Sep. 2003, pp. 1-8, vol. 5, No. 3, Publisher: KICS.

Perkins, "A Survey of Packet-Loss Recovery Techniques", "IEEE Network Magazine", 1998, pp. 1-7, Published in: London, UK.

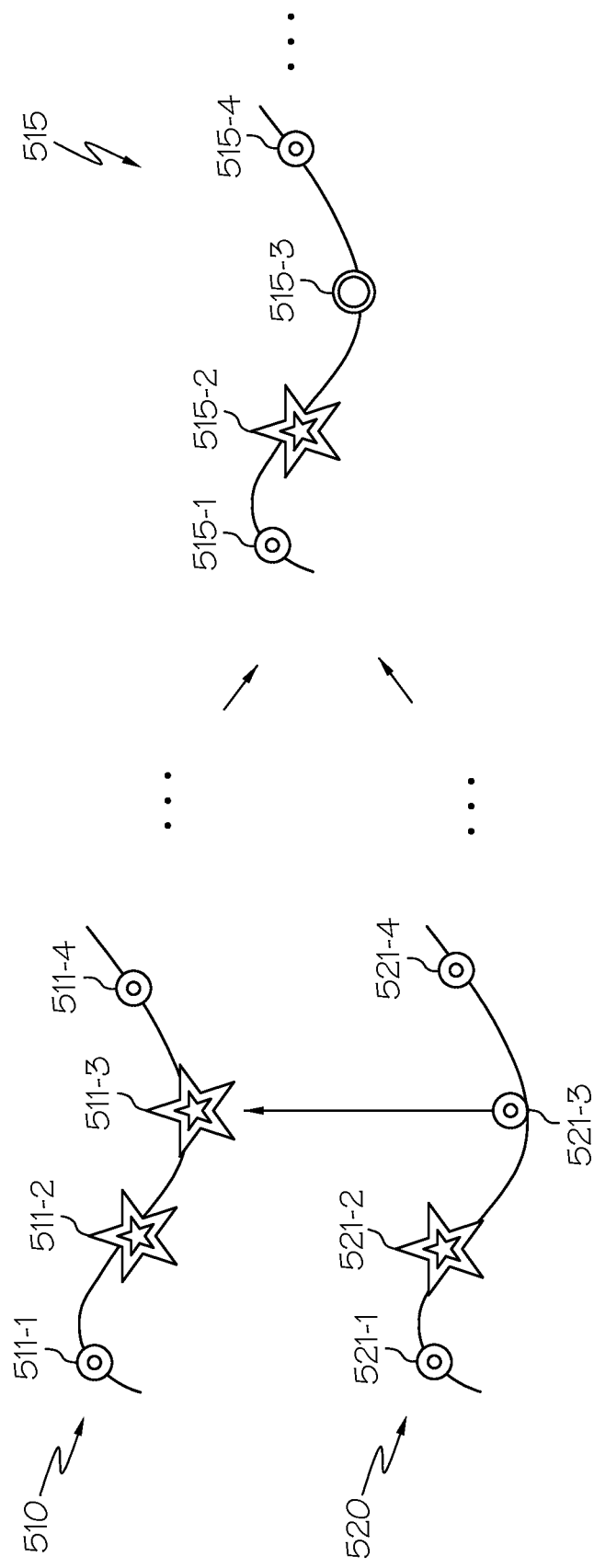

SYSTEMS AND METHODS OF PROVIDING ERROR TOLERANT ROBUST SIMPLEX WIRELESS DATA FOR SYSTEMS EMPLOYING TIME CORRELATED DATA TRANSFER

CROSS-REFERENCE TO RELATED APPLICATIONS

This application claims the benefit of U.S. Provisional Application Ser. No. 61/412,844, entitled "SYSTEMS AND METHODS OF PROVIDING ERROR TOLERANT ROBUST SIMPLEX WIRELESS DATA FOR SYSTEMS EMPLOYING TIME CORRELATED DATA TRANSFER" filed Nov. 12, 2010, which is hereby incorporated by reference in its entirety.

GOVERNMENT LICENSE RIGHTS

This invention was made with Government support under FA9453-08-C-0162 awarded by AFRL. The Government may have certain rights in the invention.

BACKGROUND

In navigation systems, sensors are sampled at high rates with high quantized levels which generates a substantial volume of data. Further, maintaining the high precision accuracy needed for navigation is achieved via systems with the ability to be continuously calibrated and updated. In the past, communicating with such navigation sensors was commonly achieved through the use of gimbals which integrated wired connections to a data processing system. In newer navigation system designs, gimbals are sometimes no longer required. Instead, the navigation sensors are supported by unique methods such as air bearings, where physical wired connections to the sensors no longer exist. As such, high speed wireless connections become necessary.

Wireless connections are susceptible to data transmission issues including signal interference, multi-path errors, and signal drop-out that results in bit errors. For navigation systems to function properly, especially for in flight scenarios, data transmission issues that result in data loss need to be mitigated. For the reasons stated above and for other reasons stated below which will become apparent to those skilled in the art upon reading and understanding the specification, there is a need in the art for systems and methods of providing error tolerant robust simplex wireless data for systems employing time correlated data transfer.

SUMMARY

The Embodiments of the present invention provide methods and systems for providing error tolerant robust simplex wireless data for systems employing time correlated data transfer and will be understood by reading and studying the following specification.

In one embodiment, a system for providing error tolerant simplex wireless data comprises: one or more navigation sensors each configured to produce digital samples of time correlated navigation sensor data; and a data receiving node coupled to the one or more navigation sensors by a wireless data link, wherein the wireless data link comprises a primary stream for simplex transmission of data packets of the time correlated navigation sensor data, and a secondary stream for simplex transmission of delayed data packets, the delayed data packets comprising a delayed retransmission of the time correlated navigation sensor data. Wherein when the data receiving node receives a first data packet from a first sensor of the one or more navigation sensors via the primary data stream, the data receiving node validity checks the first data packet. Wherein when the data receiving node determines that the first data packet contains corrupted data, the data receiving node validity checks a second data packet received from the first sensor via the secondary data stream. Wherein when the first data packet and the second data packet contain corrupted data, the data receiving node builds a reconstructed plurality of sequential time correlated data samples based on non-corrupted data samples from within the first data packet and the second data packet.

DRAWINGS

Embodiments of the present invention can be more easily understood and further advantages and uses thereof more readily apparent, when considered in view of the description of the preferred embodiments and the following figures in which:

FIGS. 3-4 and 5A & 5B illustrate examples of data interpolation for one or more embodiment of the present invention.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide systems and methods for navigation sensor communication links that mitigate data transmission issues including signal interference, multi-path errors, and data drop-out, that result in bit errors. More specifically, for cases of wireless data link errors and drop-outs of a finite duration, a protocol is described herein to ensure that accurate navigation sensor data is successfully provided to navigations systems, and that communication integrity is maintained. As explained in greater detail below, the underlying concept uses error detection and extra bandwidth within the wireless communications links to produce a delayed data stream. The dynamic qualities common to navigation data is exploited to interpolate time correlated data and resolve which of two samples of the same sensor data point one from the first data stream and one from the delayed data stream is correct. When both data samples appear corrupted, these same dynamic qualities are used to provide an approximate, low error replacement sample.

Figure 1:
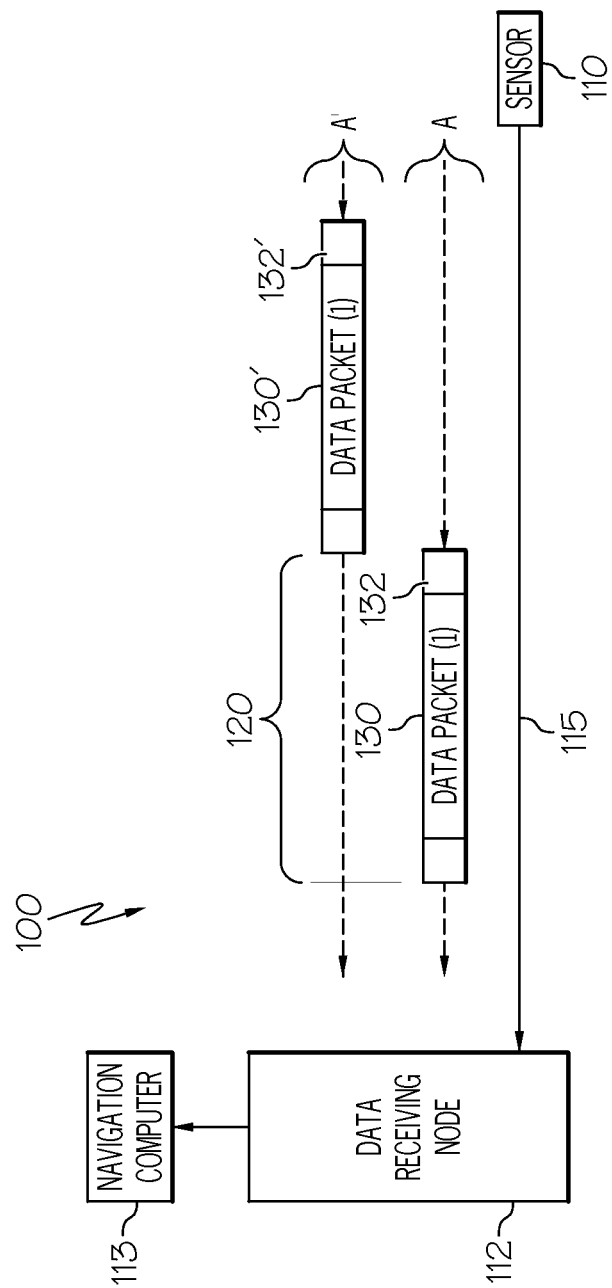
FIG. 1 illustrates dual stream data packet transmission in a wireless data link of one embodiment of the present invention.

FIG. 1 is a diagram illustrating generally at 100 a dual stream data packet transmission in a wireless data link of one embodiment of the present invention. As illustrated in FIG. 1 a sensor 110 is coupled to a data receiving node 112 by a wireless data link 115. Sensor 110 is programmed to transmit a primary stream of data packets of time correlated navigation sensor data (indicated by A) and a secondary stream of delayed duplicate data packets (indicated by A'). Wireless data link 115 includes sufficient bandwidth to simultaneously transport both the primary steam of data packets and the secondary delayed duplicate stream. As such, transmission of any one data packet does not consume more than half of the bandwidth that is available on the wireless data link 115. In one embodiment, the wireless data link 115 provides a bandwidth of at least twice that required for transmission of any data packet produced by sensor 110 and thus provides excess capacity to implement the proposed method.

In the embodiment described in FIG. 1, sensor 110 transmits a first data packet 130 on the primary stream A and then, after some delay (shown at 120), transmits a copy of data pack 130 (shown as 130') on the delayed stream A'. The delay 120 between transmitting data packet 130 and data packet 130' can be any fixed or programmable delay which is appropriate depending on the bursty nature of the signal transmission loss mechanism.

Data packets 130 and 130' each include a sequence of N sequential time correlated data samples produced by sensor 110. By having the data packets 130 and 130' carry duplicate copies of sequential time correlated data, the receiver of data streams A and A' (discussed in detail below) is able to utilize interpolation between data points within each data packet, and also between the two packets 130 and 130', to identify corrupted verse un-corrupted data points within each data packet, and estimate corrections. In one embodiment, in the event of multiple corrupted samples, interpolation across multiple corrupted data samples is performed by first finding good sample points between two redundant packets. Transmitting duplicate data packets 130 and 130' provides a way for wireless data link 115 to recover from an event that would otherwise cause an entire data packet of data samples to be lost. The time delayed data packet 130' offers data robustness above conventional error encoding and decoding mechanisms.

In one embodiment, data packets 130 and 130' each include an appended cyclic redundancy check (CRC) characters (shown at 132 and 132') to facilitate error detection and data recovery. For example, in one embodiment in operation, when the data packet 130 is received at data receiving node 112, CRC characters 132 are evaluated against the data sample payload carried by data packet 130. When the data receiving node 112 determines that CRC 132 is correct, then the data samples carried by data packet 132 are passed (such as to a navigation computer 113) for further processing. When data receiving node 112 determines that CRC characters 132 is not correct, data receiving node waits for the duplicate data packet 130' to arrive in data stream A'. Then, CRC characters 132' are evaluated against the data sample payload carried by data packet 130'. When the data receiving node 112 determines that CRC 132' is correct, then the data samples carried by data packet 132' are passed (such as to a navigation computer 113) for further processing.

When data packets 130 and 130' are both found to have incorrect CRCs, then data sample interpolation is performed. As would be appreciated by one of ordinary skill in the art upon reading this disclosure, although a CRC analysis can identify whether a data packet contains corrupted data, the analysis cannot by itself identify which of the data samples carried by the packet has become corrupt. Embodiments of the present invention take advantage of particular characteristics of navigation data in order to identify and correct corrupt data samples at the receiver without the need to request retransmission of data from the sensor.

Navigation sensor measurement data is inertial in nature and is derived by measuring physical objects which are restricted to follow certain laws of dynamics and physics. As a result, navigation sensor measurement data has the characteristic of being a correlated data set representing a physically moving body. Navigation sensor signals follows patterns, such as being predominantly a sinusoidal waveform signal, for example. The sensor waveform signal is digitally sampled (such as by an 8 or 14 bit analog-to-digital converter) to produce the samples carried by data packets 130 and 130'. The waveform is sampled at a sufficient sample rate that within data packets 130 and 130' there is relatively little difference in value from one digital sample in the sequence to the next digital sample. For this reason, it is possible to determine when data sample n+1 is corrupted within data packet 130 (or 130') by interpolating from data samples n and n+2. In alternate embodiments, the interpolation technique can be liner (for example, $(n+(n+2))/2$), cubic or other technique. When the value of data sample n+1 is not consistent with the estimate provided from the interpolation of n and n+2, then n+1 is considered a corrupted data point.

Navigation data lends itself to this kind of analysis because the data samples within data packets 130 and 130' as transmitted sensor 110 (which can be expected to operated at a frequency of 100 Hz, for example) are not changing to a significant degree over short periods of time. As such, the techniques described herein are appropriate for other applications with correlated data sets (of which sinusoidal data is just one example) and embodiments of the present invention are contemplated as encompassing such embodiments.

In one embodiment, the delay period 120 between the transmission of data packet 130 and data packet 130' is selected based on the kind and periodicity of the error or interference the wireless channel is expected to experience. In one embodiment, the wireless data link 115 is a time division multiple access (TDMA) link utilized by multiple sensors such as sensor 110 to send data packets to data receiving node 112. In one such embodiment, data packets 130 and 130' are each transmitted in timeslots assigned to data packets for sensor 130 by a TDMA schedule.

Data link 115 utilizes a simplex (that is, one way) data transmission mechanism to provide a reliable link to transfer navigation sensor data. In alternate embodiments, the data link 115 itself may optionally support duplex data transmissions even though the navigation sensor data is transmitted using the simplex communication methods described herein. By using re-transmission techniques, the scheme described in this disclosure eliminates the need to provide a duplex data transmission physical layer to support higher data reliability. Further, the technique could be applied to any physical layer. Therefore, two or more packets may be transmitted to utilize the excess bandwidth and provide data redundancy.

Figure 2:
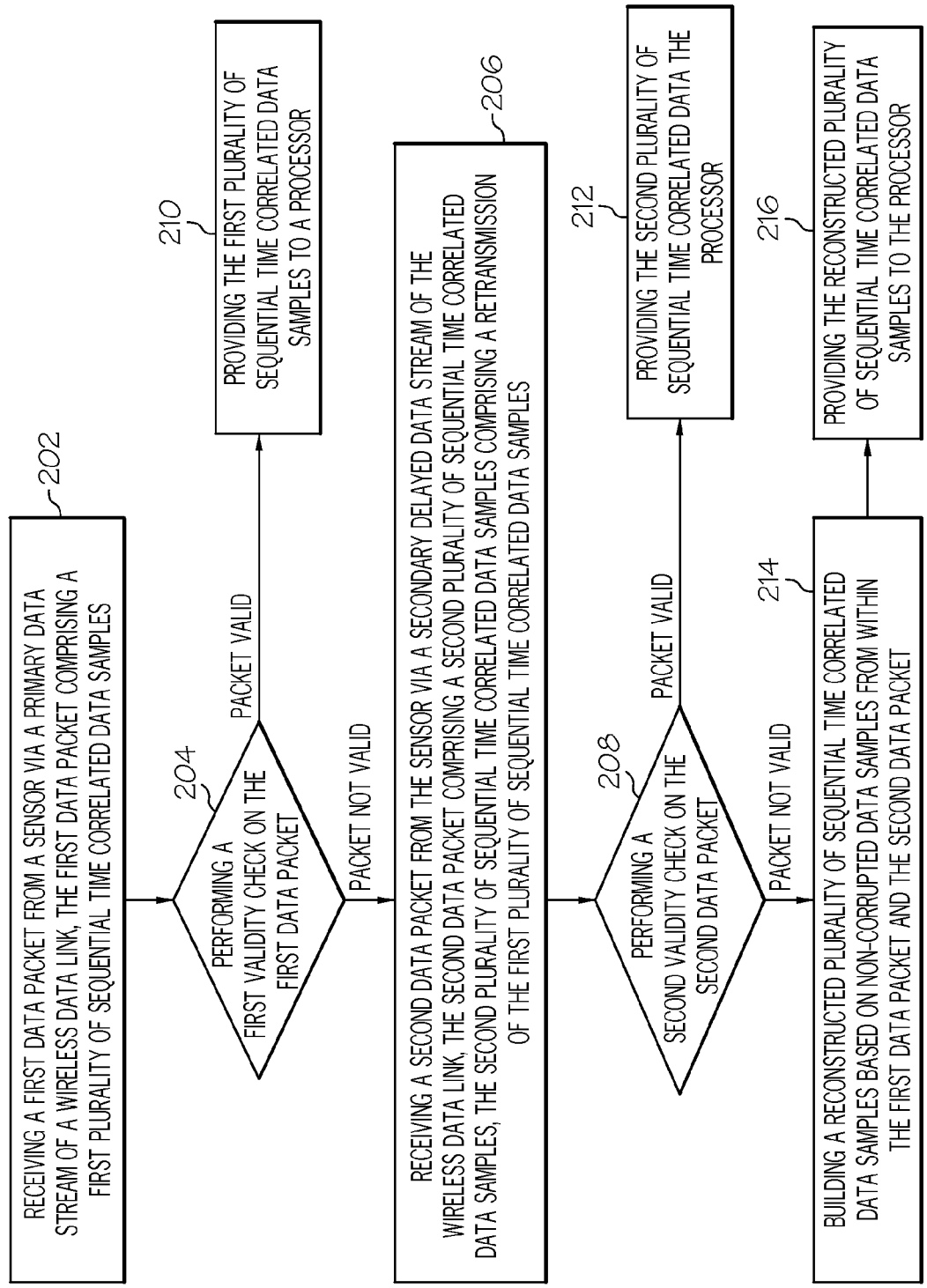
FIG. 2 is a flow chart illustrating a method of one embodiment of the present invention.

FIG. 2 is a flow chart illustrating a method of one embodiment of the present invention. For one embodiment, FIG. 2 depicts the above described logic for processing data received by data receiving node 112 of FIG. 1. The method begins at 202 with a receiving a first data packet from a sensor via a primary data stream of a wireless data link, the first data packet comprising a first plurality of sequential time correlated data samples.

The method proceeds to 204 with performing a first validity check on the first data packet. In one embodiment, the first validity check comprises checking a CRC of the first data packet for validity. When performing the first validity check determines that the first packet is correct, the method proceeds to 210 with providing the first plurality of sequential time correlated data samples to a processor.

When performing the first validity check determines that the first data packet does not contain corrupted data, the method proceeds to 206 with receiving a second data packet from the sensor via a secondary delayed data stream of the wireless data link, the second data packet comprising a second plurality of sequential time correlated data samples, the second plurality of sequential time correlated data samples comprising a retransmission of the first plurality of sequential time correlated data samples.

The method proceeds to 208 with performing a second validity check on the second data packet. In one embodiment, the second validity check comprises checking a CRC of the second data packet for validity. When performing the second validity check determines that the second data packet does not contain corrupted data, the method proceeds to 212 with providing the second plurality of sequential time correlated data the processor. The first data packet is discarded accordingly.

When the first data packet contains corrupted data and the second data packet contains corrupted data, the method proceeds to 214 with building a reconstructed plurality of sequential time correlated data samples based on non-corrupted data samples from within the first data packet and the second data packet. In one embodiment, a sample by sample comparison is performed between data samples of the first data packet and data samples of the second data packet. Because the second data packet should simply be a retransmission of the data samples from the first data packet, the sets of data samples carried by the two should be identical. Any differences identified between two supposedly identical data samples means that one, or both, of the samples are corrupted. In one embodiment, the method proceeds to 216 with providing the reconstructed plurality of sequential time correlated data samples to the processor.

Figure 3:
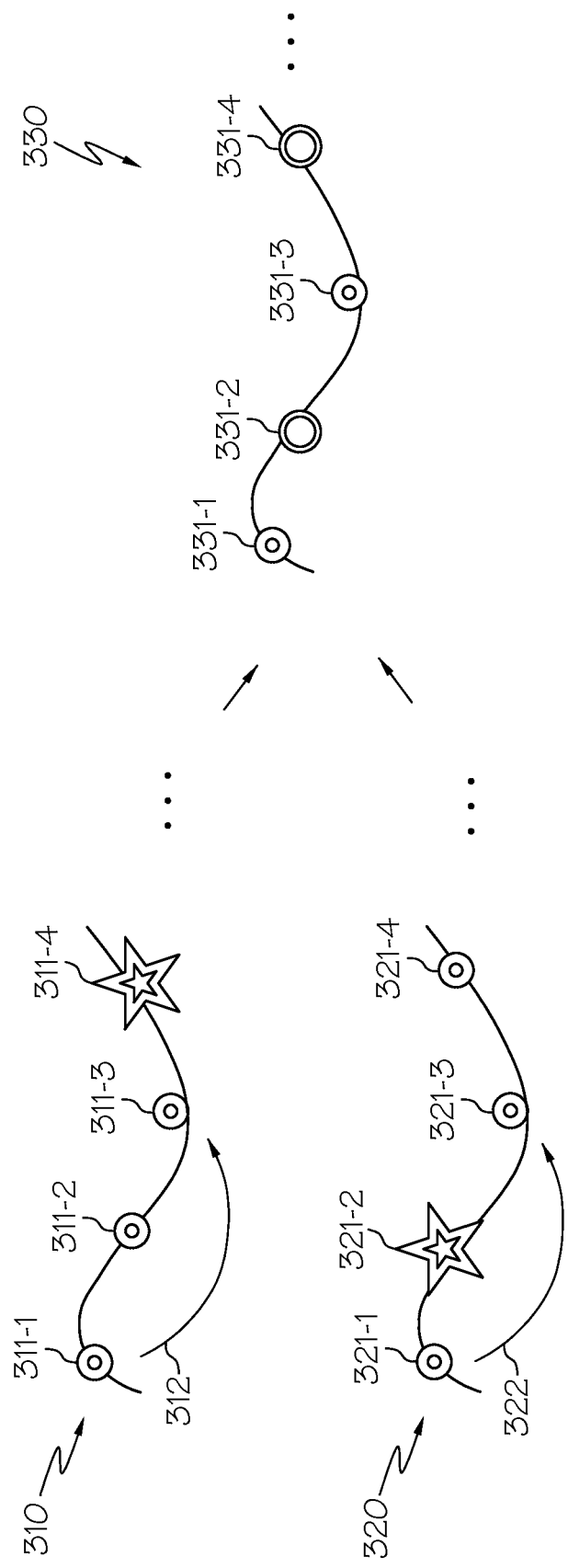

For Example, FIG. 3 illustrates an example of comparing sequential time correlated data samples from a first data packet 310 and a second data packet 320 as received at a receiving node. The first data packet 310 (comprising at least data points 311-1 to 311-4) was received on data link 115 via the primary stream. The second data packet 320 (comprising at least data points 321-1 to 321-4) was received via the secondary stream of delayed duplicate data packets and is a retransmission of the first data packet 310. The first data packet 310 includes at least one corrupted data point (shown at 311-4) and for this reason, would have failed the CRC check at block 204 of FIG. 2. The second data packet 320 includes at least one corrupted data point (shown at 321-2) and for this reason, would have failed the CRC check at block 208 of FIG. 2.

As mentioned above, the sensor waveform signal used to produce data packets 310 and 320 is digitally sampled at a sufficient sample rate that within data packets 310 and 320' there is relatively little difference in value from one digital sample in the sequence of a data packet to the next digital sample. For example, in one embodiment, data samples 311-1 and 311-3 of data packet 310 match the respective data samples 321-1 and 321-3 of data packet 320 and are therefore considered non-corrupted. Therefore, the values for these data samples are used to populate data samples 331-1 and 331-3 of the reconstructed plurality of sequential time correlated data samples shown at 330. Then, the remaining data samples of 330 are interpolated as described below. Alternately, each data point of data packets 310 and 320 may be tested individually, as described below, to cover the rare instance where to correlated data samples are both identically corrupted.

To determine whether a specific target data sample is corrupted, in one embodiment, an interpolation is performed using the data samples on either side of the target data sample. For the example of data packet 320, to test data sample 321-2 as the target data sample, an interpolation (shown at 314) is performed using data samples 321-1 and 321-3. The interpolation techniques used can be liner cubic or other technique. For this example, the value of data sample 321-2 is not consistent with the estimate provided from the interpolation of 321-1 and 321-3. For that reason, 321-2 is considered a corrupted data point. To test data sample 311-2 of data package 310, an interpolation (illustrated at 312) is performed using data samples 311-1 and 311-3. In this case, the value of data sample 311-2 is consistent with the estimate provided from the interpolation of 311-1 and 311-3. For that reason, 311-2 is considered a non-corrupted data point and will be used as the basis for populating data sample 331-3 of the reconstructed plurality of sequential time correlated data samples 330. The value corrupted data sample at 311-4 can similarly be detected and the value of data sample 321-4 can be used for the value of interpolated data sample 331-4.

As illustrated in FIG. 3, interpolation is performed to fill in for a missing (i.e. corrupted) data point occurring between two known good data samples points. There are multiple scenarios, however for single bit error case (shown at 310) or signal error and time staggering will help reduce the loss of the same sample points from both packet of a sensor data. The receiver will easily be able to locate another similar point from the other data packet.

Figure 4:
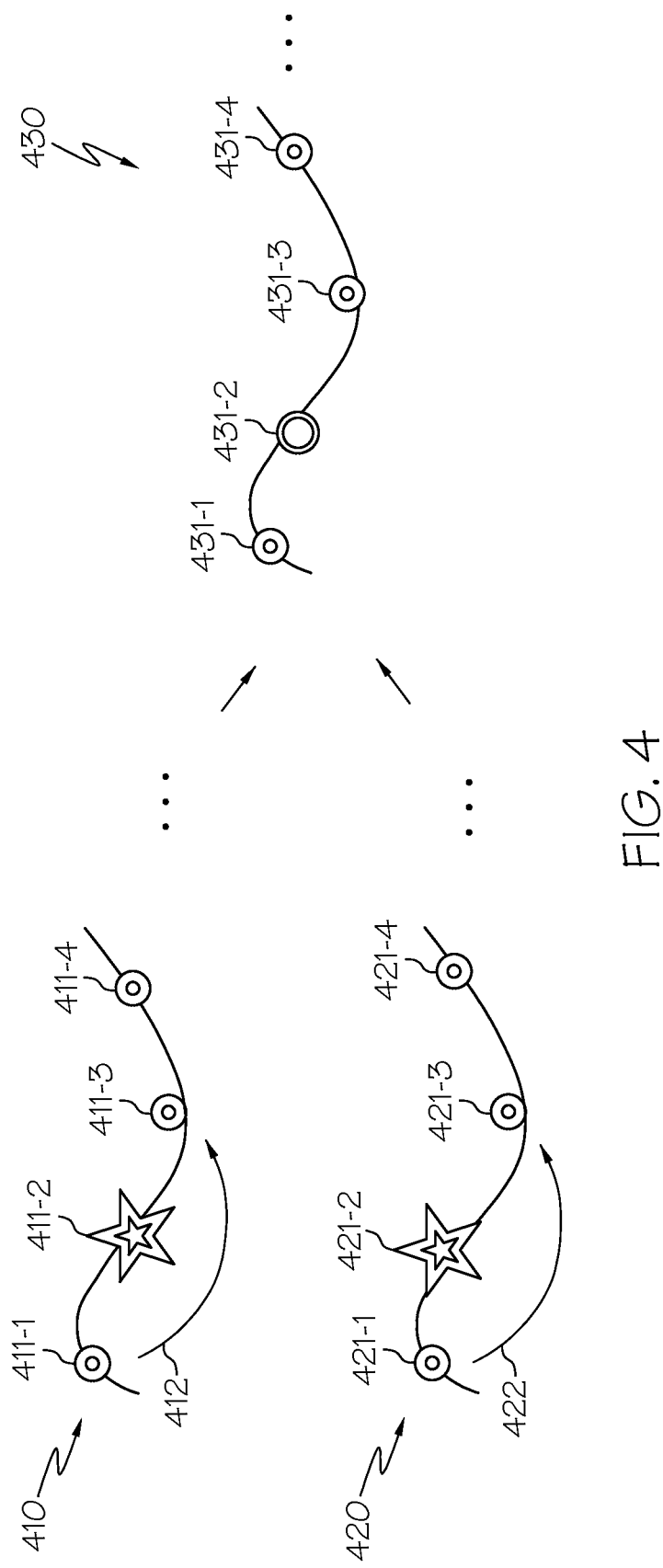

FIG. 4 illustrates another example of comparing sequential time correlated data samples from a first data packet 410 and a second data packet 420 as received at a receiving node. The first data packet 410 (comprising at least data points 411-1 to 411-4) was received on data link 115 via the primary stream. The second data packet 420 (comprising at least data points 321-1 to 321-4) was received via the secondary stream of delayed duplicate data packets and is a retransmission of the first data packet 410. The first data packet 310 includes at least one corrupted data point (shown at 411-2) and for this reason, would have failed the CRC check at block 204 of FIG. 2. The second data packet 420 includes at least one corrupted data point (shown at 421-2) and for this reason, would have failed the CRC check at block 208 of FIG. 2.

As is readily observed in the Figures, the example of FIG. 4 is different than the example of FIG. 3 in that the second data samples in both the first and second data packets are corrupted meaning there is no non-corrupted data sample which can be used to populate data sample 431-2 of the reconstructed plurality of sequential time correlated data samples shown at 430. Therefore, the non-corrupted values from either data samples 411-1, 3 and 4, or data samples 421-1, 3, or 4, are used to populated data samples 431-1, 3 and 4 while an interpolated value is used populate data sample 431-2. In one embodiment, the receiving node will use an interpolated value based on interpolating from either 411-1 to 411-3 (shown at 412) or 421-1 to 421-3 (shown at 422) to populate data sample 431-2. In another embodiment, the receiving node will combined the interpolated values from 412 and 422 (such as by averaging) to arrive at a data point value for 431-2 to use in place of the corrupted data points 411-2 and 421-2.

For the multiple bursty bit error case, where multiple sequential sample points are corrupted within a primary data packet, corresponding sample points may be missing from the secondary packet as well. In one embodiment, resolving this scenario involves interpolation within whichever data packet has the most known valid data sample points to fill the missing sample point with approximated value. That is, an interpolated result based on combined data from both A and A' is used to reconstruct data for the corrupted data point.

Figure 5B:
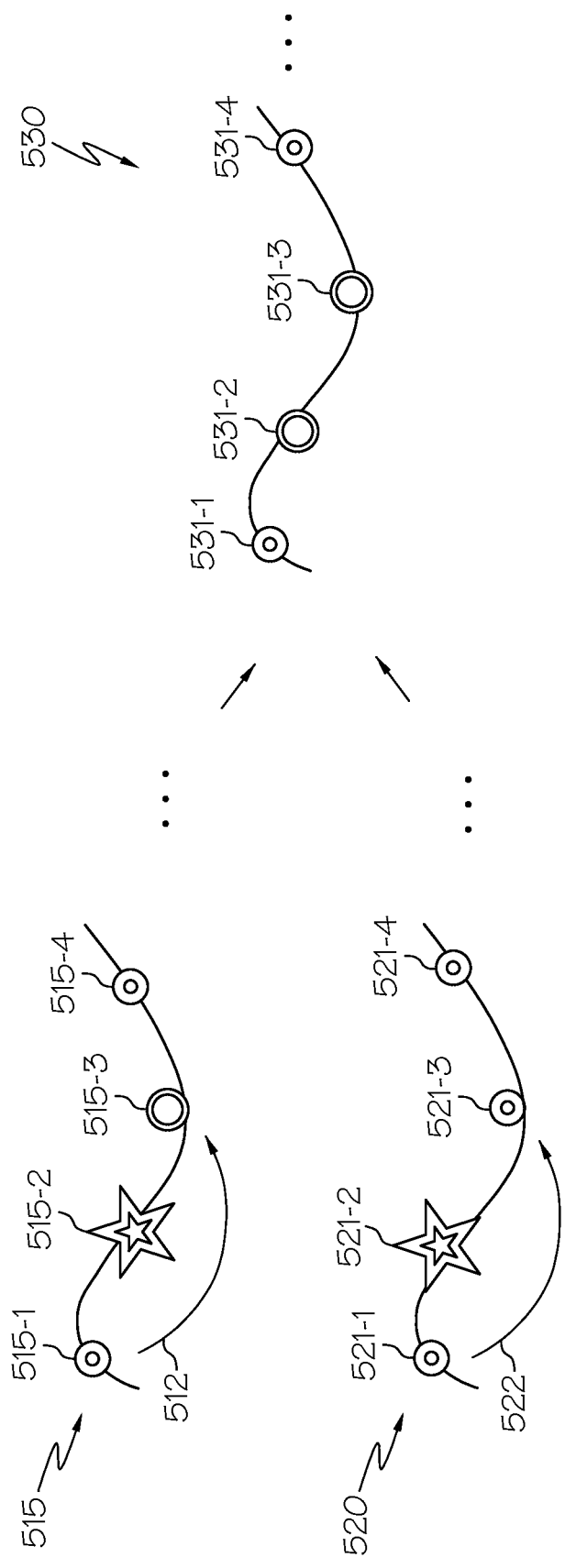

FIGS. 5A and 5B illustrate one such example of comparing sequential time correlated data samples from a first data packet 510 and a second data packet 520 where multiple sequential sample points are corrupted. The first data packet 510 (comprising at least data points 511-1 to 511-4) was received on data link 115 via the primary stream. The second data packet 520 (comprising at least data points 521-1 to 521-4) was received via the secondary stream of delayed duplicate data packets and is a retransmission of the first data packet 510. The first data packet 510 includes at least two sequential corrupted data points (shown at 511-2 and 511-3) and for this reason, would have failed the CRC check at block 204 of FIG. 2. The second data packet 520 includes at least one corrupted data point (shown at 521-2) and for this reason, would have failed the CRC check at block 208 of FIG. 2. In this example, because the sequential data points 511-2 and 511-3 are both corrupted, interpolating between 511-1 to 511-3 or between 511-2 to 511-4, would provide unreliable results.

In this case, the valid value of data sample 521-3 from data packet 520 is first used to replace the corrupted data sample 511-3 of data packet 510 to populate data sample 515-3 of an intermediate data packet 515. Intermediate data packet 515 also comprises the data samples 515-1 and 515-4 which are populated using known non-corrupted data sample values (such as from either 511-1 and 511-4, or 521-1 and 521-4). Next, the receiving node will use an interpolated value based on interpolating from either 515-1 to 515-3 (shown at 512) to populate data sample 531-2 of the reconstructed plurality of sequential time correlated data samples shown at 530. The remaining values of 531-1, 531-3 and 531-4 would come from data samples 515-1, 515-3 and 515-4 respectively of the intermediate data packet 515. These examples of interpolation schemes should not be considered as limiting, as embodiments using other schemes for interpolating between data packets having multiple sequential corrupted data points are contemplated as within the scope of embodiments of the present invention.

Figure 6:
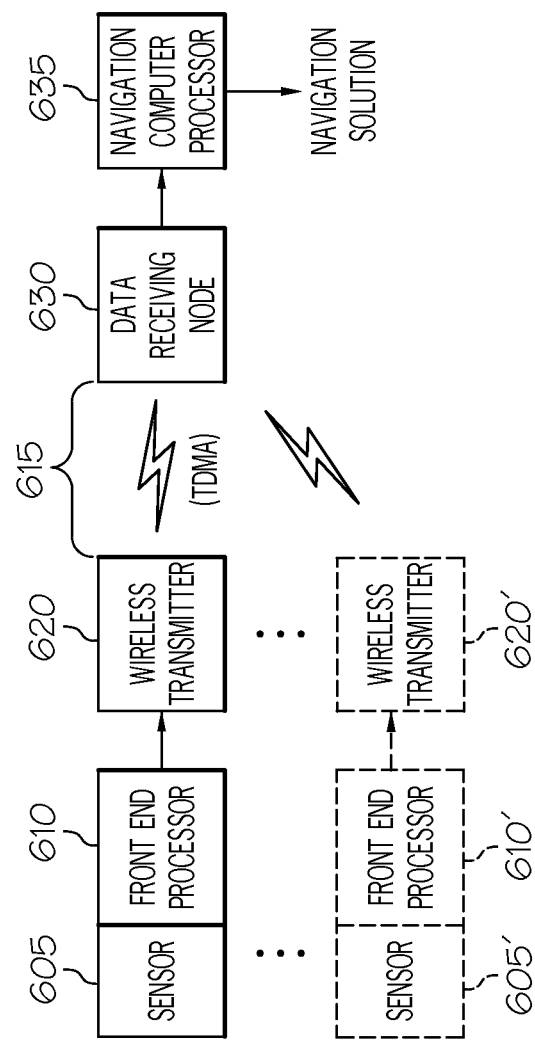
FIG. 6 illustrates a transmitter/receiver system of one embodiment of the present invention.

As illustrated in FIG. 6, in one embodiment, a transmission module front end process 610 is developed (such as with an field programmable gate array (FPGA), application specific integrated circuit (ASIC), or microcontroller) for a sensor 605 that transmits sensor data. In alternate embodiments, the descriptions provided above with respect to FIG. 1 apply to FIG. 6 and vice-verse. Sensor 605 comprises a sensor such as (but not limited to) an attitude measurement sensor or a velocity measurement sensor, and may include 3-axis sets of accelerometers and gyroscopes. In FIG. 6, transmission module front end process 610 provides the additional encoding of data samples and packet scheduling for sending data packets to a wireless transmitter module 620. In alternate embodiments, wireless transmitter module 620 use appropriate wireless technologies for simplex transmission of data packets to data receiver node module 630 over data link 615. Such wireless technologies include, but are not limited to, binary phase shift keying (BPSK), quadrature phase shift keying (QPSK), and IEEE 802.11 based wireless devices (i.e., Wi-Fi devices) using either user datagram protocol (UDP) and/or transmission control protocol (TCP).

The transmission module front end process 610 supplies a clock, a primary data stream, and a secondary delayed duplicate data stream (such as described with respect to streams A and A' of FIG. 1) on a specific time schedule to the wireless transmitter 620. The data is formatted by the front end process 610 with header information identifying the packet, frame synchronization information and appends the additional CRCs for each data element within each packet. The transmission module front end process 610 receives a stream of data samples from sensor 605 and provides an initial data packet for transmission to the wireless transmitter 620 on the primary stream, followed after a delay time by a second data packet on the secondary stream comprising a duplicate of the data carried by the initial data packet. That is, the data from the initial packet is re-transmitted using the excess bandwidth of the wireless data link 615 which provides for data redundancy in the event of an upset to the link integrity.

In one embodiment, when an initial data packet is transmitted, it is assigned a sequence number by front end process 610, which is stored in the initial data packet's header. When data the second data packet is subsequently transmitted with the duplicate data samples, it will be assigned the same sequence number as the initial data packet so that the data receiving node 630 will be able to match the data carried in the initial data packet with the data carried in the second data packet. As illustrated in FIG. 6, in some embodiments, other sensors, front end processors, and transmitters (designated by 605', 610' and 620') will utilize the same wireless channel 615 to transmit information. In one embodiment, access to the wireless channel 615 is controlled using time division multiple access (TDMA) scheduling. In one embodiment, the sensor 605, front end process 610 and/or wireless transmitter 620 are integrated as a single device.

Data receiving node 630 at the remote end of the wireless link 615 receives the initial data packet on the primary stream and the second data packet on the secondary stream for analysis such as described above with respect to FIGS. 2-5. In one embodiment, a navigation computer 635 coupled to the data receiving node 630 will evaluate and make the necessary decisions on the data integrity of the packets received, as described above in FIGS. 2-5. In one embodiment, navigation computer 635 checks and accepts data by validating the packet header information and the CRCs while using the methods identified above when the checksums indicate corruption. In one embodiment, the data receiving node 630 and the navigation computer 635 are integrated as a single device.

Several means are available to implement the systems and methods of the current invention as discussed in this specification. These means include, but are not limited to, digital computer systems, microprocessors, general purpose computers, programmable controllers and field programmable gate arrays (FPGAs) or application-specific integrated circuits (ASICs). Therefore other embodiments of the present invention are program instructions resident on computer readable media which when implemented by such means enable them to implement embodiments of the present invention. Computer readable media include any form of a physical computer memory storage device. Examples of such a physical computer memory device include, but is not limited to, punch cards, magnetic disks or tapes, optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for providing error tolerant simplex wireless data, the method comprising:
    receiving a first data packet from a sensor via a primary data stream of a wireless data link, the first data packet comprising a first plurality of sequential time correlated data samples;
    performing a first validity check on the first data packet;
    when performing the first validity check determines that the first data packet does not contain corrupted data, providing the first plurality of sequential time correlated data samples to a processor;
    when performing the first validity check determines that the first data packet contains corrupted data, receiving a second data packet from the sensor via a secondary delayed data stream of the wireless data link, the second data packet comprising a second plurality of sequential time correlated data samples, the second plurality of sequential time correlated data samples comprising a retransmission of the first plurality of sequential time correlated data samples;
    performing a second validity check on the second data packet;
    when performing the second validity check determines that the second data packet does not contain corrupted data, providing the second plurality of sequential time correlated data the processor;
    when the first data packet contains corrupted data and the second data packet contains corrupted data, building a reconstructed plurality of sequential time correlated data samples based on non-corrupted data samples from within the first data packet and the second data packet, and providing the reconstructed plurality of sequential time correlated data samples to the processor.

2. The method of claim 1, wherein the primary data stream of the wireless data link and the secondary delayed data stream of the wireless data link each consume no more than half of an available bandwidth of the wireless data link.

3. The method of claim 1, wherein the sensor produces navigation measurements that follow a predominantly sinusoidal waveform pattern.

4. The method of claim 1, wherein the first data packet includes cyclic redundancy check information utilized in performing the first validity check; and
    the second data packet includes cyclic redundancy check information utilized in performing the first validity check.

5. The method of claim 1, wherein building a reconstructed plurality of sequential time correlated data samples further comprises:
    performing a sample by sample comparison between data samples of the first data packet and data samples of the second data packet; and
    populating the reconstructed plurality of sequential time correlated data samples with non-corrupted data samples based on the sample by sample comparison.

6. The method of claim 5, wherein building a reconstructed plurality of sequential time correlated data samples further comprises:
    interpolating between two non-consecutive data samples to determine when an interviewing data sample is corrupted.

7. The method of claim 5, wherein building a reconstructed plurality of sequential time correlated data samples further comprises:
    populating the reconstructed plurality of sequential time correlated data samples with at least one interpolated sequential time correlated data sample.

8. The method of claim 7, wherein the at least one interpolated sequential time correlated data sample is based on an interpolation using data samples from both the first plurality of sequential time correlated data samples and the second plurality of sequential time correlated data samples.

9. A system for providing error tolerant simplex wireless data, the system comprising:
    one or more navigation sensors each configured to produce digital samples of time correlated navigation sensor data; and
    a data receiving node coupled to the one or more navigation sensors by a wireless data link, wherein the wireless data link comprises a primary stream for simplex transmission of data packets of the time correlated navigation sensor data, and a secondary stream for simplex transmission of delayed data packets, the delayed data packets comprising a delayed retransmission of the time correlated navigation sensor data;
    wherein when the data receiving node receives a first data packet from a first sensor of the one or more navigation sensors via the primary data stream, the data receiving node validity checks the first data packet;
    wherein when the data receiving node determines that the first data packet contains corrupted data, the data receiving node validity checks a second data packet received from the first sensor via the secondary data stream;
    wherein when the first data packet and the second data packet contain corrupted data, the data receiving node builds a reconstructed plurality of sequential time correlated data samples based on non-corrupted data samples from within the first data packet and the second data packet.

10. The system of claim 9, further comprising a navigation processor coupled to the data receiving node;
    wherein when the data receiving node determines that the first data packet does not contain corrupted data, the data receiving node outputs a first plurality of sequential time correlated data samples from the first data packet to the navigation processor;
    wherein when the data receiving node determines that the second data packet does not contain corrupted data, the data receiving node outputs a second plurality of sequential time correlated data samples from the second data packet to the navigation processor; and
    wherein when the data receiving node determines that the first data packet and the second data packet contain corrupted data, the data receiving node outputs the reconstructed plurality of sequential time correlated data samples to the navigation processor.

11. The system of claim 9, wherein the primary data stream of a wireless data link and the secondary delayed data stream of the wireless data link each consume no more than half of an available bandwidth of the wireless data link.

12. The system of claim 9, wherein the data receiving node builds the reconstructed plurality of sequential time correlated data samples by performing a sample by sample comparison between data samples of the first data packet and data samples of the second data packet; and
> populating the reconstructed plurality of sequential time correlated data samples with non-corrupted data samples based on the sample by sample comparison.

13. The system of claim 9, wherein the data receiving node builds the reconstructed plurality of sequential time correlated data samples by interpolating between two non-consecutive data samples to determine when an interviewing data sample is corrupted.

14. The system of claim 9, wherein the data receiving node builds the reconstructed plurality of sequential time correlated data samples by populating the reconstructed plurality of sequential time correlated data samples with at least one interpolated sequential time correlated data sample.

15. The system of claim 14, wherein the at least one interpolated sequential time correlated data sample is based on an interpolation using data samples from both the first plurality of sequential time correlated data samples and the second plurality of sequential time correlated data samples.

16. The system of claim 9, wherein when the first sensor transmits the first data packet on the primary stream, it is assigned a sequence number stored a header of the first data packet; and
> when the first sensor transmits the second data packet on the secondary stream, it is assigned the same sequence number as the first data packet which is stored in a header of the second data packet.

17. A computer-readable media device, the computer-readable media device having stored thereon computer-executable instructions for performing a method for providing error tolerant simplex wireless data, the method comprising:
> performing a first validity check on a first data packet received from a navigation sensor via a primary data stream of a wireless data link, the first data packet comprising a first plurality of sequential time correlated data samples;
> when the first validity check determines that the first data packet does not contain corrupted data, outputting the first plurality of sequential time correlated data samples to a processor;
> when performing the first validity check determines that the first data packet contains corrupted data, performing a second validity check on a second data packet received from the navigation sensor via a secondary data stream of a wireless data link, the second data packet comprising a second plurality of sequential time correlated data samples, the second plurality of sequential time correlated data samples comprising a delayed retransmission of the first plurality of sequential time correlated data samples;
> when the second validity check determines that the second data packet does not contain corrupted data, outputting the second plurality of sequential time correlated data the processor; and
> when the first data packet contains corrupted data and the second data packet contains corrupted data, building a reconstructed plurality of sequential time correlated data samples based on non-corrupted data samples from within the first data packet and the second data packet.

18. The computer readable media device of claim 17, the method further comprising:
> performing a sample by sample comparison between data samples of the first data packet and data samples of the second data packet; and
> populating the reconstructed plurality of sequential time correlated data samples with non-corrupted data samples based on the sample by sample comparison.

19. The computer readable media device of claim 17, the method further comprising:
> interpolating between two non-consecutive data samples to determine when an interviewing data sample is corrupted.

20. The computer readable media device of claim 17, the method further comprising:
> populating the reconstructed plurality of sequential time correlated data samples with at least one interpolated sequential time correlated data sample.

* * * * *